(12) United States Patent
Lemmer et al.

(10) Patent No.: US 12,203,626 B2
(45) Date of Patent: Jan. 21, 2025

(54) OPTICAL ELEMENT, PROJECTION MODULE, VEHICLE AND METHOD

(71) Applicant: PLASTIC OMNIUM LIGHTING SYSTEMS GMBH, Munich (DE)

(72) Inventors: Eduard Lemmer, Neu-Ulm (DE); Sergej Schwarz, Langenau (DE)

(73) Assignee: PLASTIC OMNIUM LIGHTING SYSTEMS GMBH, Munich (DE)

(*) Notice: Subject to any disclaimer, the term of this patent is extended or adjusted under 35 U.S.C. 154(b) by 0 days.

(21) Appl. No.: 18/267,665

(22) PCT Filed: Dec. 15, 2021

(86) PCT No.: PCT/EP2021/085941
§ 371 (c)(1),
(2) Date: Sep. 29, 2023

(87) PCT Pub. No.: WO2022/129199
PCT Pub. Date: Jun. 23, 2022

(65) Prior Publication Data
US 2024/0052991 A1    Feb. 15, 2024

(30) Foreign Application Priority Data
Dec. 16, 2020   (DE) .................. 10 2020 216 041.4

(51) Int. Cl.
*B60Q 1/24*    (2006.01)
*F21S 43/20*   (2018.01)
*F21S 43/27*   (2018.01)

(52) U.S. Cl.
CPC ............. *F21S 43/26* (2018.01); *F21S 43/27* (2018.01); *B60Q 1/247* (2022.05)

(58) Field of Classification Search
CPC .......................... B60Q 2400/40; B60Q 1/247
See application file for complete search history.

(56) References Cited

U.S. PATENT DOCUMENTS 8,100,540 B2    1/2012  Huebner
2010/0277696 A1   11/2010  Huebner
(Continued)

FOREIGN PATENT DOCUMENTS

DE       19805771 A1    8/1999
DE    102015224305 A1    6/2017
(Continued)

OTHER PUBLICATIONS

International Search Report of PCT/EP2021/085941 mailed Apr. 7, 2022, 5 pages.
(Continued)

*Primary Examiner* — Eric T Eide
(74) *Attorney, Agent, or Firm* — BROOKS KUSHMAN P.C.

(57) ABSTRACT

The invention relates to an optical element having a plurality of projection lenses (4) and at least one housing (2). in which the projection lenses (4) are accommodated. The projection lenses (4) are connected to the housing (2) by overmolding the projection lenses (4) during the production of the housing 2 by means of an injection molding method. Furthermore. the invention relates to a projection module having the optical element, to a vehicle having the optical element and to a method for producing the optical element.

14 Claims, 1 Drawing Sheet

(56) References Cited

U.S. PATENT DOCUMENTS

2013/0130674 A1* 5/2013 De Wind ............. B60Q 1/2669
                                                362/546
2020/0290516 A1* 9/2020 Messenger ............ F21S 41/285
2020/0377008 A1   12/2020 Sobecki et al.

FOREIGN PATENT DOCUMENTS

| DE | 102016119326 A1 | 4/2018 |
| DE | 102019204523 A1 | 10/2020 |
| DE | 102019209780 A1 | 1/2021 |
| EP | 3460150 B1 | 11/2020 |
| JP | 4128167 B2 | 7/2008 |

OTHER PUBLICATIONS

Written Opinion of of PCT/EP2021/085941 mailed Apr. 7, 2022, 7 pages.

* cited by examiner

OPTICAL ELEMENT, PROJECTION MODULE, VEHICLE AND METHOD

CROSS-REFERENCE TO RELATED APPLICATIONS

This application is the U.S. national phase of PCT Application No. PCT/EP2021/085941 filed on Dec. 15, 2021, which claims priority to DE Patent Application No. 10 2020 216 041.4 filed on Dec. 16, 2020, the disclosures of which are incorporated in their entirety by reference herein.

TECHNICAL FIELD

The invention is based on an optical element according to the preamble of claim 1. Furthermore, the invention is based on a projection module with the optical element, a vehicle with the optical element, and a method for producing the optical element.

BACKGROUND

In order to distinguish different vehicle models or vehicle brands from one another, lighting scenarios are being used more and more frequently. The lighting scenarios can be used for example to greet a driver. For example, a carpet of light can be projected in front of a door of the vehicle when the vehicle is unlocked.

A projection module which projects the lighting scenario, that is for example the carpet of light, has at least one optical device for this purpose which has at least one lens, in particular a projection lens. The optical device has a housing into which the lens is installed. This means that the lens and, if applicable, additional optical components such as a diaphragm are installed in the housing to form an assembly. If multiple projection lenses are provided, these are installed separately in the housing, which is time-consuming and expensive. This leads to a comparatively high number of installation steps. In addition, the components have positional tolerances relative to one another. The tolerated positional deviations of the components influence a light image emitted by the projection module and cause light images to deviate from one another when comparing several projection modules. Minimizing the positional tolerances of the components would be conceivable, but this is extremely time-consuming and expensive.

SUMMARY

It is an object of the present invention to provide an optical element for a projection module and a projection module that is simple in terms of device technology and inexpensive. Furthermore, it is a task of the present invention to create a vehicle with the optical element or the projection module that is simple in terms of device technology and inexpensive. In addition, it is an object of the present invention to provide a simple and inexpensive method for producing the optical element.

With regard to the optical element, the object is achieved according to the features of claim 1. With regard to the projection module, the object is achieved according to the features of claim 9; with regard to the vehicle, the object is achieved according to the features of claim 10; and with regard to the method, the object is achieved according to the features of claim 12.

Particularly advantageous embodiments are found in the dependent claims.

According to the invention, an optical element, in particular for a vehicle, is provided with at least one projection lens, that is to say a lens which can be used in a projection module such as for example a collimation lens, and a housing. The projection lens is incorporated into the housing. The housing is formed in an injection molding method, wherein the at least one projection lens is connected to the housing by overmolding the projection lens using the injection molding method. In other words, the projection lens is inserted, for example into a cavity which is used for the production of the housing by the injection molding method, and is subsequently overmolded so that the projection lens is connected thereto during the production of the housing. It would also be conceivable to produce the projection lens and the housing in a multi-component injection molding method, wherein the projection lens can be one component, and the housing can be an additional component.

An advantage of this invention is that the projection lens can be positioned very precisely by overmolding in the housing during the production of the housing. That is to say, the projection lens can be precisely positioned by being inserted into the cavity which is used in the injection molding method, or can be produced inexpensively with low tolerances during a multi-component injection molding method. In a conventional optical device which has the same components as the optical element and in which the projection lens is installed in the housing, an adjustment is usually necessary after installation so that the projection lens is precisely positioned in the housing. The adjustment must be performed in an additional operation, and a conventional optical device is therefore comparatively expensive to produce. It has been shown that the projection lens can be produced with the housing in a simple manner with low tolerances by the being overmolded. In addition, because the housing is connected to the projection lens with low tolerances by overmolding the projection lens, the adjustment operation can be omitted. In other words, a mounting step can therefore be spared. In general, when the optical element is used in a vehicle, it is necessary for a light source, the light of which can be coupled into the projection lens, to be positioned very precisely with respect to the projection lens, so that a light image to be projected is sharp. Since the projection lens is inexpensively connected to the housing with an extremely small tolerance during production, only the housing must be positioned relative to the light source. In a conventional optical device, the light source must be positioned relative to the housing, and the housing must be positioned relative to the projection lens. This means that the tolerance chain can be shortened in the optical element of the invention, and additional costs can therefore be saved. In addition, the optical element, which is produced by overmolding the projection lens, can be produced very easily by the injection molding method. This means that the projection lens does not have to be installed manually in the housing, for example. Another advantage is that the projection lens cannot move relative to the housing, for example due to vibration, since it is firmly or integrally connected to the housing. In other words, the position of the projection lens in the housing can be ensured at any time. Another advantage compared to a conventional optical device is that no additional fastening means for fastening the projection lens to the housing are necessary.

In a preferred exemplary embodiment, the housing has at least one optical element which is integrally formed with the housing and/or with the projection lens during the injection molding method, wherein the optical element can be designed to influence light which can be radiated through the projection lens. That is to say, the housing and/or the projection lens preferably form at least the optical element. This is advantageous since the optical element does not have to be attached or fastened to the housing by an additional working step. This allows the optical element to be manufactured together with several functional elements at very low cost. In addition, the optical element does not have to be positioned in an additional working step to form the projection lens, but rather is positioned with low tolerances by the injection molding method directly relative to the projection lens during production. As a result, no adjustment of the optical element relative to the projection lens is necessary, whereby an additional working step can be avoided, and the positioning can additionally be very accurate. Another advantage is that the optical element cannot be displaced relative to the projection lens or the housing, for example by shaking or vibration when the projection lens is being used since it is integrated in the housing. In other words, the position of the optical element relative to the projection lens can be ensured at any time so that a projection which can be projected by the optical element can have a high quality.

The optical element preferably has a plurality, i.e., at least two, projection lenses. The optical element is preferably designed such that it is arranged between the projection lenses so that scattered light between the projection lenses is at least mostly, or almost completely, or completely avoided. Preferably, the optical element is arranged on the side of a coupling-in side and/or a coupling-out side of the projection lenses. In other words, the optical element is preferably designed as a shutter or diaphragm so that the light beams of individual projection lenses are shaded or separated from one another. In other words, light that can be coupled into the particular projection lens does not couple into an adjacent additional projection lens. This is advantageous since, for example, different images can be projected by a projection module having the optical element. For example, light from a light source may couple into a particular projection lens, and light shining through a particular projection lens may project a particular image. If the light beams are shaded from one another, this prevents scattered light from the one projection lens from coupling into the additional projection lens and hence a another image from being projected. The optical element that is arranged between the projection lenses can, for example, be a lateral diaphragm that separates the lenses from one another. Light reflection can be absorbed by the lateral diaphragm. This results in high quality images being projectable through a projection module that has the optical element.

Alternatively to a diaphragm, the optical element can be a reflector or an absorber which separates the projection lenses from one another on the coupling-out side and/or the coupling-in side. For example, the optical element that is an absorber can absorb light so that the light that couples into one of the projection lenses cannot couple into an additional projection lens. In other words, scattered light between the projection lenses can be avoided by the absorber. The optical element can also be a reflector which, in particular, can reflect scattered light so that light from one projection lens does not couple into an additional projection lens.

In a preferred embodiment, the optical element may circumferentially encompass, or surround, or overlap the projection lenses at least partially, preferably completely, in a direction in which the light can radiate through the projection lenses, that is, in the main radiation direction. This is advantageous since scattered light between the projection lenses can therefore be avoided in a simple manner.

It would also be conceivable to design the optical element as a bar. It would also be advantageous to form the optical element by multiple bars which, for example, intersect. If, for example, four projection lenses are provided which are arranged evenly as 2×12 matrix, the optical element can extend as a cross-shaped bar between the projection lenses.

The housing surrounds the projection lens or the projection lenses preferably such that they are protected from water or dirt. Preferably, no gap is formed between the projection lens(es) and the housing; instead, for example, an integral and/or fluid-tight connection is provided (in particular without additional sealing means). If multiple projection lenses are provided, they are preferably connected to one another integrally, and/or fluid-tight, and/or materially bonded, in particular without additional sealing means. The fluid-tight connection is achieved inexpensively, for example, due to a material bond between the housing and the projection lens(es) by the injection molding method. The seal is advantageous since no spray water can therefore enter the side of the optical element which may face a light source. As a result, contamination can be avoided. This is advantageous if the optical element is arranged, for example, in a sill of a vehicle in order to project a carpet of light. This is additionally advantageous since no additional seals or other elements are necessary for preventing water from entering the optical element.

In particular, the projection lenses are arranged next to each other and connected to one another. In other words, the projection lenses are formed integrally with one another. That is, the projection lenses are designed as a composite. For example, the projection lenses can be produced in an injection molding method. Since the projection lenses are connected to one another, they do not have to be inserted individually into the cavity which is used for producing the housing and are therefore easy to position. In addition, they therefore have a defined position relative to one another.

The projection lens or the composite of projection lenses can preferably have a circumferential collar or a circumferential flange. This is designed to be at least sectionally circumferential. In addition, the collar or flange can extend in a radial direction around the projection lens or around the composite of projection lenses, i.e., preferably perpendicular to the beam direction. The projection lenses or the composite of projection lenses can be connected to the housing in a form-fit via the collar, whereby the mechanical strength is additional increased.

Preferably, the plurality of projection lenses is arranged in a common plane. That is, the projection planes are preferably arranged next to each other in a plane.

In an additional exemplary embodiment, the plurality of projection lenses can be configured substantially identically, or identically, at least with respect to their light transmission. That is, the projection lenses can each preferably project a sharp light image onto a surface that is the same distance from a respective projection lens. It is also possible for each of the projection lenses to be designed differently in order to enable a sharp light image on surfaces at different distances from the optical element. For example, at least one of the projection lenses can be designed for projection near the optical element, while at least another of the projection lenses may be designed for projection farther from the optical element by comparison. This is advantageous because light images can therefore be projected easily in terms of device technology at different distances from the projection module by a projection module having the optical element.

The projection lenses can, for example, be arranged in a matrix-like manner relative to one another. That is, the plurality of projection lenses can be arranged, for example, in at least one row or in a plurality of rows. The rows can be arranged next to one another or offset from one another. Preferably, the projection lenses are arranged in a common plane.

The housing can preferably have at least one fastening element. This is preferably produced inexpensively together with the housing in the injection molding method. The fastening element is preferably formed integrally with the housing. For example, the housing can have a pin, or a drill hole, or a thread as a fastening element, in particular to thereby fasten a printed circuit board to the housing. The printed circuit board can preferably have at least one light source, the light of which can be coupled into the projection lens. Preferably, the printed circuit board has a plurality of light sources, the light of which can be coupled into at least one or a particular projection lens.

In another exemplary embodiment, the housing can additionally or alternatively have at least one positioning element with which the printed circuit board can be positioned on the housing. This is preferably produced inexpensively together with the housing in the injection molding method. For example, the positioning element is integrally formed with the housing. For example, the positioning element can be an alignment pin or an interface surface, in particular via which the circuit board can be positioned on the housing. This is advantageous since the positioning of the printed circuit board on the optical element can therefore be carried out quickly and easily. As indicated above, the positioning element and/or the fastening element can preferably be formed integrally with the housing during the injection molding method. As a result, the tolerance chain between light source and projection lens can be additional shortened so that a quality of the projection by the optical element can be increased.

In an additional exemplary embodiment, the housing can have a tubular section. The tubular section can be designed, for example, in the shape of a round tube, or a square or polygonal tube. The tubular section is preferably inexpensively formed integrally with the housing by the injection molding method. The projection lens or the projection lenses can be arranged in the tubular section so that the light, which can be radiated through the particular projection lens, radiates through the tubular section or can be guided through it. The tubular section makes it possible to easily guide the light in terms of device technology. The tubular section can connect to the coupling-in side and/or the coupling-out side of the projection lens or the projection lenses. In other words, the tubular section extends away from the coupling-in side and/or the coupling-out side of the at least one projection lens. In other words, the housing has a shaft-shaped section in which the projection lens or the projection lenses are arranged, and/or which adjoins the coupling-in side and/or the coupling-out side of the projection lens or the projection lenses. The tubular section can in particular be designed such that it forms a splash guard so that the projection lens or the projection lenses are at least partially protected from dirt or liquids. In addition, scattered light can be avoided by the tubular section.

In addition, the tubular section can be designed such that an optical component can be arranged in the beam path in front of, or behind, the or a particular projection lens. For example, one or a particular mask or one or a particular microlens array can be provided for one or a particular projection lens or for the projection lenses.

The tubular section can preferably be designed such that it does not affect light shining through it, and such that it serves as a splash guard for the at least one projection lens. The tubular section can be beveled, i.e., it can extend further away from the coupling-out side of the projection lens in the radiation direction on one side than on another side. The lowered region of the tubular section, that is to say the region which extends less far from the coupling-out side, can be lowered, for example, so that light is not absorbed or deflected by the tubular section. In other words, the tubular section has an end face which is in a plane that is aligned with the beam direction or main emission axis of the optical element, i.e., does not extend perpendicular thereto.

The optical component and the projection lens(es) are preferably arranged at a parallel distance from one another and one behind the other—viewed in the direction of the beam path.

The optical component is provided, for example, as an insert in an injection molding method, thereby easily enabling precise positioning with respect to the projection lens(es). Alternatively, it would be conceivable to introduce the optical component after the injection molding method.

In other words, a tubular wall of the tubular section has a longitudinal axis which extends perpendicular to the coupling-out side, and/or to the projection lens, and/or to the optical component. An end face which faces away from the coupling-out side has sections with different distances from the optical component when viewed in the direction of the longitudinal axis. In other words, the wall has a shortened section.

The housing can in particular be designed in the shape of a lid. For example, the housing can have a circumferential or partially circumferential collar to which the housing can be fastened. In particular, a circumferential groove for a sealing means can be formed in the collar. With the collar, the housing can overlap or wrap around an additional housing, wherein the sealing means can seal a gap between the housings.

In other words, the housing is designed in the shape of a bushing. The tubular section is provided in the bushing floor and connects a housing interior to a housing exterior and serves as a light passage. The projection lenses and the optical element can be arranged sequentially in the tubular section, thereby enabling a large sealing effect. The tubular section preferably has an outer and an inner part. The outer part can have the lowered end face. The wall of the inner part preferably has a uniform axial length. The projection lens(es) is/are arranged, for example, at the inner part in order to be able to position them preferably after a light source. The optical element is arranged, for example, between the outer and inner part.

For example, a different pattern can be projected via a particular microlens array or via a particular mask for a particular projection lens. It is therefore possible to project different patterns via the optical element. The different patterns can also be projected at different points in time. For example, a light source the light couples of which into a projection lens can be switched on.

A particular projection lens can have at least one lens or be designed as at least one lens. For example, a particular projection lens can have an inner lens and an outer lens, wherein the inner lens faces the light source and/or is arranged between the light source and the outer lens.

The housing which is produced by injection molding can be formed at least partially from polycarbonate or acrylonitrile butadiene styrene copolymer, or from a mixture of both.

The projection lens can be at least partially of polycarbonate and/or polymethyl methacrylate, for example. For example, if the projection lens has an inner lens and an outer lens, the inner lens can, for example, be at least partially made of polycarbonate, and the outer lens can be made at least partially of polymethyl methacrylate.

According to the invention, a projection module with the optical element according to one or more of the above-mentioned aspects is provided. The projection module can have a light source, the light of which can be coupled into the at least one projection lens or into a particular projection lens. In particular, the projection module has a printed circuit board with a light source or a plurality of light sources, wherein the light of a particular light source can be coupled into a particular projection lens. The projection module can additionally have at least one additional optical component, for example the microlens array, which is connected downstream from the projection lens(es). The optical component can, for example, be arranged protected in the tubular section.

According to the invention, a vehicle is provided with a projection module according to one or more of the above aspects or with an optical element according to one or more of the above aspects. The optical element or the projection module can be arranged, for example, on a body component, such as a sill. In particular, the optical element or the projection module having the optical element is used to produce a carpet of light, in particular when for example the vehicle is unlocked. It is also possible for the optical element or the projection module to form a body component or a vehicle interior panel. For example, the body component such as a front bumper, or the vehicle interior panel such as a dashboard, can be formed by an injection molding method and form the housing of the optical element. It is also conceivable for the optical element or the projection module to form a section of a vehicle outer skin of the vehicle.

In a method for producing the optical element, the at least one projection lens is overmolded in an injection molding method in order to produce the optical element which has the projection lens and the housing. This is advantageous since the optical element can be produced automatically by the injection molding method, and it can therefore be produced quickly, easily and inexpensively.

In particular, the optical element can be produced in a multi-component injection molding method, in particular a 2-component injection molding method. That is, the projection lens, or the projection lenses which are designed in particular as a composite, can be produced as a first component in an injection molding method, and the housing can be produced, in particular subsequently or simultaneously or overlapping in time or afterward, as an additional component, wherein the projection lens or the projection lenses can be located in a cavity or a tool.

An optical element with at least one projection lens and with at least one housing is created into which the projection lens is accommodated. The projection lens is connected to the housing by overmolding the projection lens during the production of the housing by an injection molding method. Furthermore, a projection module with the optical element, a vehicle with the optical element, and a method for producing the optical element are created.

BRIEF DESCRIPTION OF THE DRAWINGS

The invention will be explained in more detail below with reference to an exemplary embodiment. In the figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
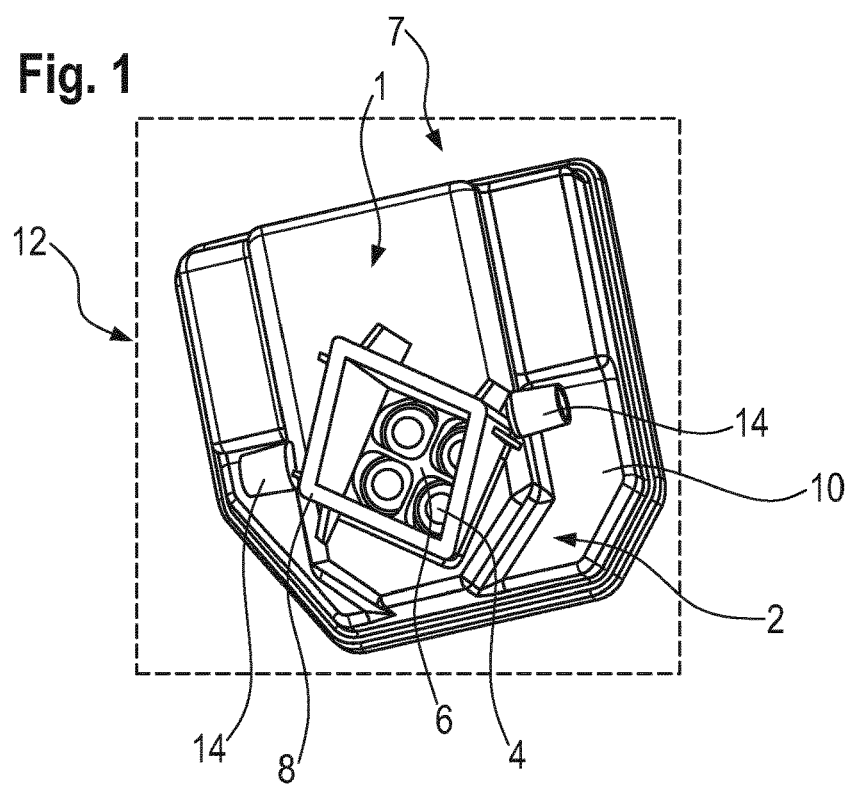
FIG. 1 shows a perspective view of an optical element according to an exemplary embodiment.

FIG. 1 shows an optical element 1 with a housing 2 and four projection lenses 4. For reasons of clarity, only one of the projection lenses 4 is provided with a reference sign. The housing 2 is produced by an injection molding method, wherein in this method, the projection lenses 4 are overmolded in order to be connected to the housing 2.

The projection lenses 4 are arranged in a matrix-like manner or in a square, wherein two projection lenses 4 each are arranged next to one another in a row, and the two rows are also arranged next to one another. Furthermore, the projection lenses 4 are arranged in a common plane.

The projection lenses 4 are each separated from one another by an optical element, which is designed as a lateral diaphragm 6, so that scattered light between the projection lenses 4 is avoided.

The optical element 1 can be part of a projection module 7 which can have the optical element 1 and a light source, which is not shown here. The projection lenses 4 are recessed into the diaphragm 6 so that the diaphragm 6 protrudes beyond the projection lenses 4 in the direction of radiation. That is, the projection lenses 4 are arranged set back in the radiation direction in relation to the diaphragm 6. This is advantageous since scattered light between the particular projection lenses 4 can therefore be substantially avoided. In the production of the housing 2, the diaphragm 6 is formed integrally therewith.

The housing 2 has a tubular section 8, which, in this exemplary embodiment, extends in the shape of a square tube. The housing 2 additionally has a plate-shaped section 10 which extends substantially in a plane which is arranged approximately perpendicular to the radiation direction. The tubular section 8 extends approximately perpendicularly away from the plate-shaped section 10 of the housing 2. In the tubular section 8, the projection lenses 4 are arranged in such a way that the light which can be radiated through the particular projection lens 4 radiates through the tubular section 8. The tubular section 8 is beveled, i.e., it extends further away from the plate-shaped section 10 on one side than on another side. The lowered region of the tubular section 8, that is to say the region which extends less far away from the plate-shaped section 10, can be lowered, for example, so that light is not absorbed or deflected by the tubular section 8. In other words, the section 8 has an end face which is in a plane that is aligned with the beam direction or main emission axis of the optical element, i.e., does not extend perpendicular thereto. In other words, light that radiates through the projection lens 4 can strike a surface on which a projection is to be projected at a greater angle due to the lowering of the tubular section 8. The higher region, i.e., the region of the tubular section 8 which extends further away from the housing 2, can be designed so that no scattered light radiates in this direction, and to protect the projection lenses 4 from water or dirt. For example, the optical element 1 can be attached to a sill of a vehicle 12, which is shown here by a dashed line, and the tubular section 8 can prevent dirt or splashing water from splashing onto the projection lenses 4.

In addition, the housing 2 has two fastening elements 14 which in this embodiment are designed as two tubular projections. In addition to the tubular section 8, these extend away from the plate-shaped section 10 in opposite directions in a direction perpendicular to the radiation direction. The fastening elements 14 can, for example, have a thread into which a screw can be screwed, so that the housing 2 can be fastened to the vehicle 12 with the projection lenses 4.

According to FIG. 1, the housing 2 is designed like a lid so that it can interact with an additional housing, for example.

Figure 2:
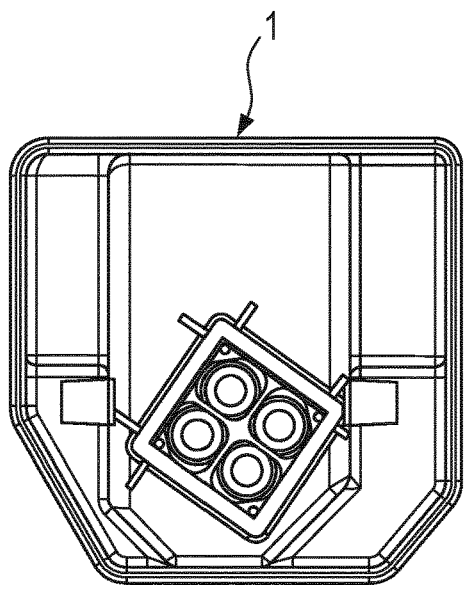
FIG. 2 shows a plan view of the optical element from FIG. 1.

FIG. 2 shows a plan view of the optical element 1.

Figure 3:
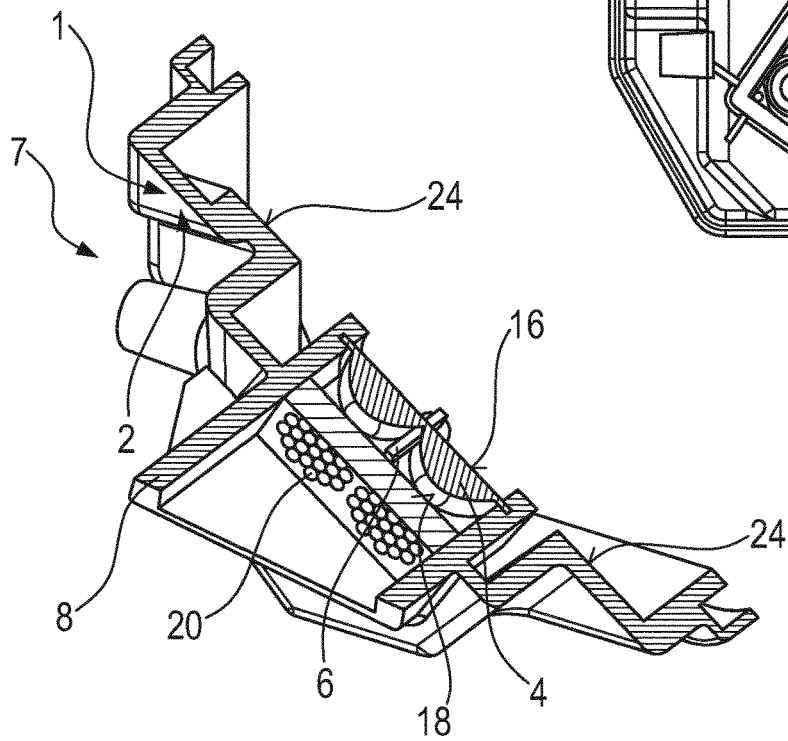
FIG. 3 shows a perspective sectional view of a projection module with the optical element from FIG. 1.

FIG. 3 shows the projection module 7 having the optical element 1. It can be seen that the projection lenses 4 are integrally connected. In other words, the four projection lenses 4 form a composite and are integrally formed.

In FIG. 3, it can be seen that the housing 2 has a circumferential flange at the edge of the section 10, into which a circumferential groove for a sealant is formed in the end face. With the flange, the housing 2 can enclose or surround an additional housing, wherein the sealing means can seal a gap between the housings.

FIG. 3 additionally shows that the projection lenses 4 have a peripheral collar. This is designed to be at least sectionally circumferential. In addition, the collar can extend in a radial direction, i.e., preferably perpendicular to the beam direction. The projection lenses 4 can be connected to the housing 2 in a form-fit via the collar, which additionally increases the mechanical strength.

Furthermore, the diaphragm 6 comprises the projection lenses 4 on an coupling-in side 16 of the projection lenses 4, as well as on a coupling-out side 18 of the projection lenses 4, so that scattered light between the projection lenses 4 is avoided. The tubular section 8 also comprises the projection lenses 4 on the coupling-in side 16 and on the coupling-out side 18, wherein the tubular section 8 on the side of the coupling-out side 18 projects further from the projection lenses 4 than on the side of the coupling-in side 16.

The tubular section 8 additionally has a region in which an optical component, in this embodiment a microlens array 20, is attached. The microlens array 20 is part of the projection module 7 which has the optical element 1 and the microlens array 20. In addition, the projection module 7 can have a printed circuit board with light sources, wherein the light of a particular light source can couple into a particular projection lens 4. The printed circuit board with the light sources is not shown here.

So that the printed circuit board with the light sources can be positioned easily and precisely on the housing 2, the housing has positioning elements which are adjustment surfaces 24 in this exemplary embodiment. By placing the circuit board with the light sources on the adjustment surfaces 24, the particular light source, which is not shown here, can be at a suitable distance to the particular projection lens 4 and positioned relative thereto.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SIGNS

Optical element 1
Housing 2
Projection lens 4
Diaphragm 6
Projection module 7
Tubular section 8
Plate-shaped section 10
Vehicle 12
Fastening element 14
Coupling-in side 16
Coupling-out side 18
Microlens array 20
Alignment surfaces 24

The invention claimed is:

1. An optical element comprising:
   projection optics including a plurality of projection lenses; and
   at least one housing in which the projection lenses are accommodated,
   wherein the projection lenses are connected to the housing by overmolding, wherein the housing has at least one diaphragm for influencing a light which can radiate through the plurality of projection lenses, wherein the diaphragm is integrally formed with the housing and arranged between the projection optics, and wherein the projection optics are recessed into the diaphragm so that the diaphragm at least partially protrudes beyond the projection optics in a direction in which the light can radiate through the projection optics such that stray light is avoided between the projection optics on an out-coupling side.

2. The optical element according to claim 1, wherein the projection lenses are surrounded watertight by the housing.

3. The optical element according to claim 1, wherein the projection lenses are integrally formed with one another and are arranged next to each other.

4. The optical element according to claim 1, wherein the housing comprises at least one fastening element and/or at least one positioning element with which a printed circuit board can be fastened and/or positioned on or in the housing, wherein the fastening element and/or the positioning element is integrally formed with the housing.

5. The optical element according to claim 1, wherein the housing comprises a tubular section which is integrally formed with the housing and in which the projection lenses are arranged and which extends from an coupling-out side of the projection lenses so that light which can be radiated through the respective projection lenses radiates through the tubular section.

6. The optical element according to claim 5, wherein the tubular section is designed such that an optical component is arranged in the tubular section in a beam path behind the particular projection lens.

7. The optical element according to claim 6, wherein the optical component is a mask.

8. The optical element according to claim 5, wherein the tubular section is beveled, whereby an end face of the tubular section extends further away from the coupling-out side of the projection lenses in the radiation direction on one side than on another side.

9. A projection module comprising an optical element according to claim 1.

10. A vehicle comprising a projection module according to claim 9.

11. The vehicle according to claim 10, wherein the housing of the optical element forms at least part of a body component or a body of the vehicle.

12. A method for producing the optical element of claim 1, the method comprising:
   overmolding the projection lenses to form the housing; and
   integrally forming the diaphragm with the housing.

13. The method according to claim 12, wherein the optical element is produced in a multi-component injection molding method, wherein the projection lenses are one component and the housing is an additional component.

14. The method according to claim 12, wherein the optical element is produced in an injection molding method, wherein the projection lenses are cast at a time before the housing and then used as an insert during the injection molding of the housing.

\* \* \* \* \*